United States Patent
Sundarraj et al.

(10) Patent No.: US 8,287,966 B2
(45) Date of Patent: Oct. 16, 2012

(54) SPRAY CAST MIXED-MATERIAL VEHICLE CLOSURE PANELS

(75) Inventors: Suresh Sundarraj, Bangalore (IN); Arun M. Kumar, Bangalore (IN); Anil K. Sachdev, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1052 days.

(21) Appl. No.: 12/240,131

(22) Filed: Sep. 29, 2008

(65) Prior Publication Data
US 2009/0096245 A1   Apr. 16, 2009

Related U.S. Application Data

(60) Provisional application No. 60/978,801, filed on Oct. 10, 2007.

(51) Int. Cl.
*B05D 1/02* (2006.01)
(52) U.S. Cl. ............... 427/427.1; 427/372.2; 427/383.1; 427/385.5; 427/421.1; 427/427; 427/427.3; 427/427.4; 296/146.1; 296/146.11
(58) Field of Classification Search ............... 427/372.2, 427/383.1, 385.5, 421.1, 427, 427.1, 427.3, 427/427.4; 296/146.1, 146.11
See application file for complete search history.

(56) References Cited

U.S. PATENT DOCUMENTS

| | | | |
|---|---|---|---|
| 5,445,324 A | | 8/1995 | Berry et al. |
| 5,472,038 A | * | 12/1995 | Forrest et al. ............ 164/46 |
| 5,980,604 A | | 11/1999 | Lavernia |
| 6,296,043 B1 | | 10/2001 | Bowen et al. |
| 6,746,225 B1 | | 6/2004 | McHugh |
| 6,777,035 B1 | | 8/2004 | Grinberg et al. |
| 6,949,299 B2 | | 9/2005 | Roche et al. |
| 7,154,932 B2 | | 12/2006 | Jones et al. |
| 2005/0194825 A1 | * | 9/2005 | Kurz et al. .............. 297/219.1 |

FOREIGN PATENT DOCUMENTS

| | | |
|---|---|---|
| DE | 202005014268 | 1/2006 |
| DE | 102004027628 | 2/2007 |

\* cited by examiner

*Primary Examiner* — Mark Kopec
*Assistant Examiner* — Haidung Nguyen
(74) *Attorney, Agent, or Firm* — Reising Ethington P.C.

(57) ABSTRACT

Unitary closure panels for automotive vehicles may be formed to have regions of different materials by a spray casting process. Separate sprays of different materials, for example two different metal alloys, are applied to touching regions of a spray application surface. The separate sprays may be applied sequentially or simultaneously to the forming surface to coat the respective regions so that the regions are contiguous or overlapping and a unitary body is formed. The spray formed body may be compressed and trimmed between facing surfaces to form a vehicle closure panel of specified outline, curvature, thickness, and porosity.

20 Claims, 2 Drawing Sheets

SPRAY CAST MIXED-MATERIAL VEHICLE CLOSURE PANELS

This application claims the benefit of U.S. Provisional Application No. 60/978,801, titled "Spray Cast Mixed-Material Structural Members", filed Oct. 10, 2007.

TECHNICAL FIELD

This disclosure pertains to making vehicle body or closure panels with contiguous or overlapping surface regions formed of two or more different materials. More specifically, this disclosure pertains to the use of spray casting of different materials for making such mixed-material vehicle closure panels.

BACKGROUND OF THE INVENTION

There is a continuing need to reduce weight of automotive vehicle components in order to reduce fuel consumption of passenger and commercial vehicles. Some vehicle components may have one portion that could be formed of a relatively light weight material and another portion that requires a stronger but heavier material. An example of such components include vehicle closure panels such as an inner or outer door panel, deck lid panel, tailgate panel, hood panel, or quarter panel. A major portion of the panel might be formed of a light weight reinforced polymer composition or a low density metal such as an aluminum alloy or a magnesium alloy. And contiguous edge portions of the panel, where hinges or latching mechanisms are attached, could be made of a stronger material such as a steel alloy. However, the manufacture of such mixed material panels have required complex and expensive processing.

This disclosure provides a spray casting based practice for the manufacture of mixed-material vehicle closure panels.

SUMMARY OF THE INVENTION

This invention is applicable generally to vehicle closure panels that may be formed by spraying and accumulating atomized drops of a molten material in a body on a collecting surface. Two or more sprays are used to form a panel having two touching regions, contiguous or overlapping, of different materials.

Sometimes the spray collecting surface is a forming surface (like a mold or die surface) shaped to form a side of the panel. In another embodiment the spray collecting surface may be a metal stamping or a polymer shape to which a higher strength material is sprayed to locally strengthen specific areas of the metal stamping or polymer shape. In one embodiment, molten metal or polymer melt is prepared under suitable conditions and placed in a tundish for the spray casting operation. This is done for each material to be sprayed. A controlled stream of each liquid material is drained from a tundish, or other holding vessel, and the liquid stream is suitably atomized into droplets of desired size. Atomization may be obtained, for example, by impacting the falling material stream with radially inwardly directed jets from a surrounding annular stream of atomizing gas, such as nitrogen. In other embodiments, known metal spraying techniques other than the molten metal spray may be used to achieve a desired outcome.

Each of the spray processes is controlled so that the drops accumulate and solidify on the collecting/forming surface to form a body region with minimal porosity consistent with the properties of the sprayed liquid. Such spray casting permits portions of different thicknesses to be formed in the spray cast area on the forming surface. In forming automotive body panels, the sprayed material may be, for example, a metal such as a ferrous alloy, an aluminum alloy, or a magnesium alloy. In another example, the sprayed material may be a thermoplastic or uncured thermosetting polymeric composition such as polyethylene, polypropylene, polyamide, polyurethane, or the like. The separate spray streams may be applied to the forming surface simultaneously or sequentially. The separate spray streams may be joined along edges, or the material spray may overlap all or portions of the previous layer. The temperature of the forming surface is suitably controlled for accumulation of the sprayed drops ultimately in a solid mass of desired porosity (or non-porous condition) and local thickness over the spray area. Each spraying operation (processing parameters such as melt temperature, temperature of atomizing gas, ambient temperature, spray distance, and temperature of the substrate or forming surface) is suitably controlled to manage the partial or complete solidification of the sprayed material before, or as, it impacts the collecting surface.

Reinforcement of a sprayed panel may be obtained, for example, by placing a mat of reinforcing fibers (such as steel wool, glass fibers, ceramic fibers, or any combination thereof) on the spray receiving surface and infiltrating the mat with the liquid spray. Or reinforcement within the sprayed body may be attained by including reinforcing particles (including short fibers) in the spray droplets.

After the sprayed material has accumulated on the receiving surface to a desired shape it will, in many embodiments, be a precursor of the desired vehicle body panel member. The spray cast precursor body panel may be further consolidated, shaped, trimmed or the like to a more finished formed closure panel by a compacting step such as hot isostatic pressing, die pressing, die trimming, or the like. The spray collecting surface may be used to shape a side(s) of the closure panel or the solidified panel member may be removed from the collecting surface for shaping, trimming, etc. In many embodiments of the invention, the spraying and any subsequent shaping step may be conducted in a closed chamber with a protective atmosphere, such as an atmosphere of argon or nitrogen.

In many embodiments of the invention two or more materials are sprayed, simultaneously or sequentially, on the forming surface to form a unitary closure panel having a first region of one material such as an aluminum alloy and a second region of a second material such as a steel alloy. In one embodiment, an edge of the second region is touching and joined to an edge of the first region. In another embodiment, the two materials may be layered so that the second or subsequent layers may overlap all or a portion of the preceding sprayed layer. Separate melts of the two materials may be prepared in separate vessels in one or more melting chambers. The respective molten materials are maintained in atmospheres that protect desired properties of the respective melts.

In an embodiment of the invention, the structure of a closure panel to be manufactured is analyzed to identify two or more distinct regions that may advantageously be made of metallic or polymeric materials having different properties. A gathering or forming surface is then prepared to shape a side of the body panel to be formed. The forming surface may be preheated to enhance agglomeration and continuity of the sprayed material. The sprays of the different materials are then directed to the respective distinct regions of the forming surface with sufficient overlapping or merging of the different materials to form a unitary panel. The regions of overlapping materials may be heat treated to enhance their joining and properties. In another embodiment a thin coating of a metal alloy interlayer may be deposited over at least a portion of the first material, and the second material may be deposited over at least a portion of the interlayer, to enable a well bonded corrosion-resistant transition between the two base materials.

It is contemplated that this spray practice of different materials may be used to form two-material vehicle closure panels. Such vehicle closure panels may include door panels, hood panels, tailgate panels, deck lid panels, or quarter panels. Vehicle doors are often made by separately forming complementary inner and outer door panels. Each panel is often made of a shaped sheet material to define a vehicle closure member and a window opening. The panels are ultimately attached to each other (e.g., adhesively bonded or hemmed and welded) around the perimeter of matching peripheral edges. The attached panels define a space between them for a window, window closure hardware, wiring, door closure and locking components, and the like. The assembled closure member is attached on one side to a vehicle body structure. In accordance with an embodiment of this invention, a door inner panel, for example, may be formed of a major sheet area of a light weight material such as an aluminum alloy or magnesium alloy and a smaller, but stronger hinge area or door closure area of a steel alloy. In another embodiment, the inner panel may be made of a major sheet area of a polymeric (or fiber reinforced polymer) and a metal alloy hinge or closure area.

Other embodiments and advantages of the invention will be apparent from more detailed descriptions of preferred embodiments and references to the figures.

DESCRIPTION OF PREFERRED EMBODIMENTS

This invention provides a method for forming unitary vehicle closure panels having a first region of a first material and an adjacent and touching, or an at least partially overlapping, second region of a second material. Such vehicle closure panels are usually stamped from a sheet material and hinges or the like are attached to the formed panel. This invention provides a method of forming integrally bonded panel portions and hinge or latch portions of different materials. The panel portion may be composed of a light weight material, while the hinge or latch portion may be composed of a heavier and stronger material. Thus, the vehicle closure panels of the invention may be lighter than known closure panels while still providing the necessary strength for a particular application in the vehicle.

In various embodiments, the vehicle closure panel may be, but is not limited to, a door inner panel, door outer panel, tailgate panel, hood panel, deck lid panel, or quarter panels. A spray cast method is used to form at least one of the two regions. The first and second regions may be formed of different metal compositions, of different polymer compositions, or of a metal composition and a polymer composition. The first and second regions may be side-by-side or at least partially overlapping.

Figure 1:
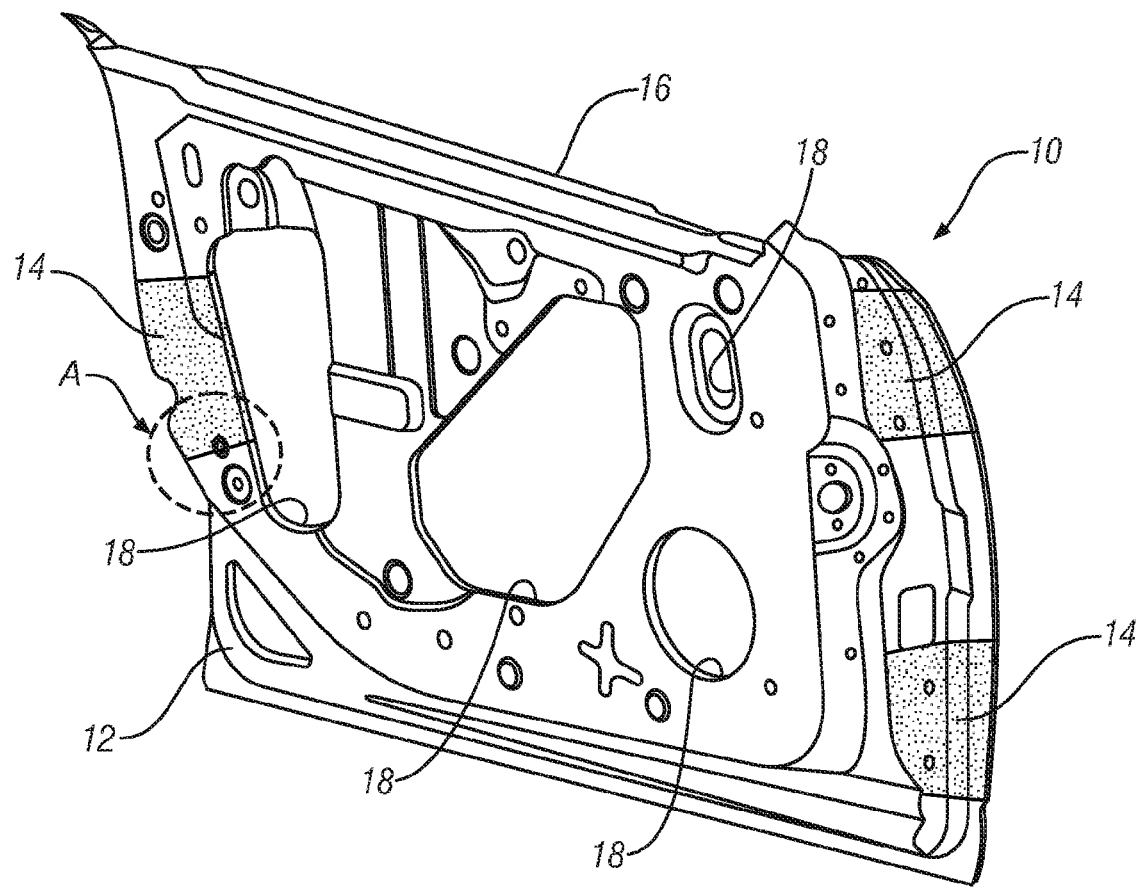
FIG. 1 illustrates a two-material door inner panel according to one embodiment of the invention.

In one embodiment of the invention, a generally sheet type vehicle closure panel is formed. For example, the closure panel may be an inner door panel 10 for an automotive vehicle, as illustrated in FIG. 1. In this example, a first region or major panel area 12 of the inner door panel will be formed of spray cast aluminum alloy and a second region or smaller hinge or latch attachment area 14 will be formed of a carbon steel alloy. The inner door panel 10 is basically a curved, three-dimensional, door surface layer structure of shaped sheet material with a window opening 16 in its upper region and openings 18 in the lower part of the panel for driver or passenger activated door and window closure mechanisms, speakers, or access to other components. In the example of FIG. 1, the panel area 12 is formed of a spray cast aluminum alloy and the attachment area 14 is formed of spray cast carbon steel. The areas 12 and 14 are touching side-by-side. The inner door panel 10 is shaped to fit against and be attached to a complementary door outer panel (not shown). Both panels may be curved for the shape of the vehicle body to which they are hinged and latched. Various electrical and mechanical window and door closure components may be assembled between the inner and outer panels in vehicle manufacture.

Figure 2:
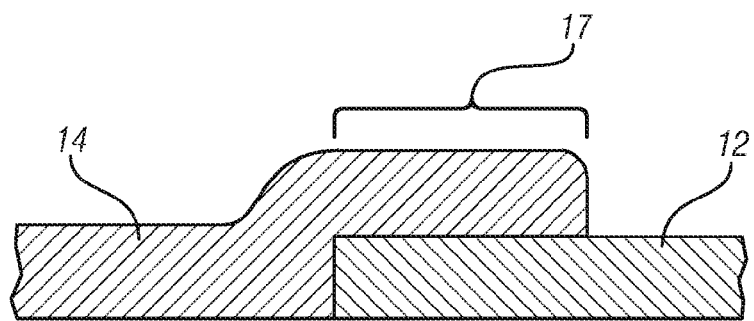
FIG. 2 illustrates a cross-sectional view of a portion of two-material door inner panel according to one embodiment of the invention.
Figure 3:
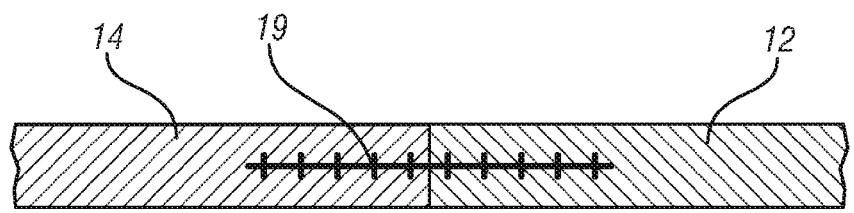
FIG. 3 illustrates a cross-sectional view of a portion of a two-material door inner panel according to one embodiment of the invention.

FIG. 2 shows a cross-sectional view of region A in FIG. 1. In the embodiment shown in FIG. 2, the areas 12 and 14 touch in an overlapping region 17. In another embodiment (not shown), a thin coating of a metal alloy interlayer may be located in the overlapping region 17 between the area 12 and the area 14. FIG. 3 also shows a cross-sectional view of region A in FIG. 1. In the embodiment shown in FIG. 3, the areas 12 and 14 touch side-by-side and the areas 12 and 14 include a reinforcing material 19, for example a porous wire mat, onto which the spray cast alloy was sprayed. The reinforcing material 19 may be located where the areas 12 and 14 touch and may extend for some distance into the areas 12 and 14.

Figure 4:
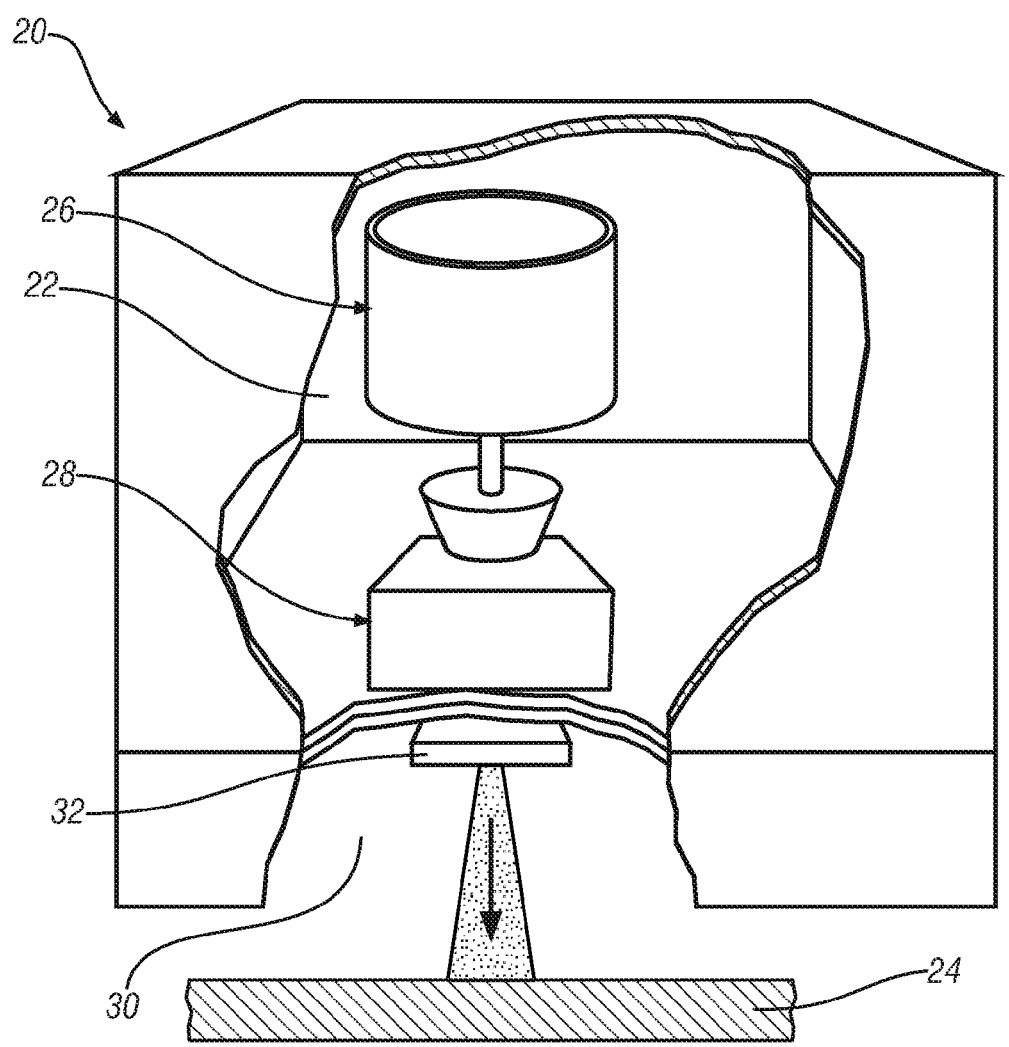
FIG. 4 is a schematic view, in vertical arrangement, of a melt crucible and a tundish in a vacuum melt chamber. An atomizer for a stream of molten material is in a separate atmosphere-controlled chamber below the melt chamber and the atomized stream falls onto a forming surface.

FIG. 4 illustrates an exemplary spray casting apparatus 20. Such apparatus 20 comprises an upper chamber 22 (optionally closable for atmospheric control) in which a melt of metal alloy or polymer is prepared for spray casting onto a forming surface or mold die cavity 24 in the shape of, for example, the door inner panel 10. In another embodiment, the surface may be a metal stamping or a polymer shape that has the minimum thickness and minimum strength properties of the desired vehicle closure panel. A higher strength material is sprayed over portions of the metal stamping or polymer shape to locally strengthen those areas. Referring again to FIG. 4, depending on the composition of a specified metal alloy or polymer the upper chamber 22 may be adapted to accommodate vacuum melting, or melting in a protective gaseous atmosphere, of the sprayable composition. When a suitable melt has been prepared, molten metal (or polymer material) may be drained from a melt crucible 26 into a tundish 28 for melt spraying. The melt crucible 26 and tundish 28 may be located in the upper chamber 22. In this embodiment, spray castable material then flows down into a lower chamber 30 in which spray casting onto the forming surface 24 for the inner door panel 10 (or other part) or onto a collecting surface provides a precursor shape for the part to be formed. The lower chamber 30 may be under vacuum or in a protective gaseous atmosphere depending on the particular materials being used.

As the spray castable material is released from the tundish 28 it is atomized in atomizer 32 and sprayed as droplets in a suitable pattern onto the part forming surface. Atomization may be accomplished by impingement of an inert gas against the stream dropping from the tundish 28.

There are other processing variables that may be managed in the spray casting operation. For example, the temperature of the molten material, the size range of the spray droplets, the distance of the spray path, the nature and temperature of the atomization medium, and the temperature of the surface on which the spray accumulates are variables that may be considered in an effort to accumulate a suitable thickness of sprayed material on a forming surface. The material droplets/particles may be solid, partly solid and partly liquid, or liquid when they impact the forming surface or previously deposited material. In other embodiments, any suitable known metal spraying technique may be used to form the first and second region of a vehicle closure panel.

In many embodiments of the invention, there will be two separate spray steps of the type described above. A first material spray stage will form, for example, the aluminum alloy panel area 12 and a second spray cast stage will provide the steel hinge attachment area 14. The spray patterns will be controlled so that there will be continuity and suitable attachment of the two contiguous material regions of the formed part. In one embodiment of the invention the forming surface 24 may be first positioned for a first spray casting stage and then moved into position for a second spray stage.

In another embodiment, the first spray step will form a first panel area, and the second spray step will form a second panel area or layer overlapping all or portions of the first panel area. In another embodiment, a very thin interlayer is formed over at least a portion of the first panel area, and then the second spray step forms a layer overlapping all or portions of the interlayer. The interlayer may function as a corrosion-resistant transition between the two sprayed materials. The interlayer may be composed of any suitable brazing alloy composition.

After the spray casting has been completed, the forming surface 24 carrying the two sprayed material areas 12, 14 may be removed from the lower spray chamber 30. The sprayed materials may be subjected to further thermal processing or thermo-mechanical processing. In general, it may be helpful to use an opposing, complementary forming tool or surface to compact the layer(s) of the two sprayed materials against the original forming surface. Such processing consolidates the sprayed material to a desired density, local thicknesses, local curvature, and edges of the sprayed body may be trimmed or the like to bring the spray cast precursor body to (or close to) finished dimensions. Thus, a vehicle closure panel such as a curved, generally rectangular, vehicle inner door panel is formed in a few processing steps with connected and/or at least partially overlapping regions of different metals (or polymer materials). Such a panel may, for example, have a length and width of about 1 meter and a thickness of approximately 1 mm to 4 mm.

In some spray casting steps it may be useful to include particles or short fibers of reinforcing material in the metal droplets. The particles or fibers may include steel wool, glass fibers, ceramic fibers, or any combination thereof. In other embodiments it may be useful to place a reinforcing porous wire mat or the like in the forming surface and fill the reinforcing object with sprayed liquid droplets. The reinforcing mat may include reinforcing fibers such as steel wool, glass fibers, ceramic fibers, or any combination thereof.

Thus, it is seen that many vehicle closure panels having contiguous or overlapping regions of different materials may be formed by the disclosed spray cast processes.

Practices of the invention have been shown by examples that are presented as illustrations and not limitations of the invention.

The invention claimed is:

1. A method of making a vehicle closure panel having joined first and second regions formed of a first material and a second material, where each of the first and second materials may be a metal, metal alloy, or a polymeric composition, the method comprising:
spraying atomized droplets of the first material on a spray receiving surface, the spray of the first material being directed to form a sprayed deposit of a first predetermined thickness that is a precursor of the first region of the vehicle closure panel;
spraying atomized droplets of the second material on the spray receiving surface, the spray of the second material being directed to form a sprayed deposit of a second predetermined thickness that is a precursor of the second region of the vehicle closure panel, the sprayed first and second materials contacting each other; and
subjecting the first and second regions to thermal processing or thermomechanical processing to form the spray deposited precursors of the first and second regions of the vehicle closure panel into the joined first and second regions of the vehicle closure panel.

2. A method of making a vehicle closure panel as recited in claim 1 in which the second material is sprayed over at least a portion of the first material, and the second region overlaps at least a portion of the first region.

3. A method of making a vehicle closure panel as recited in claim 1 in which the first and second regions have contiguous edges.

4. A method of making a vehicle closure panel as recited in claim 3 in which one of the first region or the second region is a hinge area, and the other is a panel area.

5. A method of making a vehicle closure panel as recited in claim 3 in which one of the first region or the second region is a latch area, and the other is a panel area.

6. A method of making a vehicle closure panel as recited in claim 1 in which the first material is a first metal alloy and the second material is a different metal alloy.

7. A method of making a vehicle closure panel as recited in claim 1 in which the first material is a metal alloy and the second material is a polymer composition or polymer composite composition.

8. A method of making a vehicle closure panel as recited in claim 1 in which the first material is an aluminum alloy or magnesium alloy and the second material is a steel alloy.

9. A method of making a vehicle closure panel as recited in claim 1 in which one of the first or second materials contains reinforcing particles.

10. A method of making a vehicle closure panel as recited in claim 1 in which reinforcing material is placed on at least a portion of the spray receiving surface and atomized droplets of the first material are sprayed onto and into the reinforcing material to form a reinforced precursor of the first region.

11. A method of making a vehicle closure panel as recited in claim 10 in which the reinforcing material comprises at least one of steel wool, glass fibers, or ceramic fibers.

12. A method of making a vehicle closure panel as recited in claim 10 in which atomized droplets of the second material are sprayed onto and into the reinforcing material to form a reinforced precursor of the second region.

13. A method of making a vehicle closure panel as recited in claim 1 in which spraying atomized droplets of the first and second materials is carried out at the same time.

14. A method of making a vehicle closure panel as recited in claim 1 in which the droplets of the second material are sprayed after the first precursor region has been formed.

15. A method of making a vehicle closure panel as recited in claim 1 in which the first predetermined thickness and the second predetermined thickness are about 1 mm to about 4 mm.

16. A method of making a vehicle closure panel as recited in claim 1 further comprising depositing an interlayer over at least a portion of the first region of the vehicle closure panel.

17. A method of making a vehicle closure panel as recited in claim 1 in which the spray receiving surface comprises one of a metal stamping or a polymer shape.

18. A method of making a vehicle closure panel as recited in claim 1 in which the vehicle closure panel comprises one of a door inner panel, door outer panel, hood panel, tailgate panel, deck lid panel, or quarter panel.

19. A method of making a vehicle closure panel comprising:
    spraying atomized droplets of a first material on a spray receiving surface to form a first region of the vehicle closure panel;
    spraying atomized droplets of a second material on the spray receiving surface to form a second region of the vehicle closure panel having an edge touching the first region of the vehicle closure panel;
    subjecting the first and second regions to thermal processing or thermomechanical processing;
    wherein the first and second materials are selected such that the second region is stronger than the first region; and
    wherein the surface area of the first region is larger than the area of the second region.

20. A method of making a vehicle closure panel as recited in claim 19 in which the second region forms a hinge or latch portion of the vehicle closure panel.

* * * * *